(12) United States Patent
Hill

(10) Patent No.: US 8,001,057 B1
(45) Date of Patent: Aug. 16, 2011

(54) QUANTITATIVE EMPLOYMENT SEARCH AND ANALYSIS SYSTEM AND METHOD

(76) Inventor: Paul D. Hill, Topanga, CA (US)

( * ) Notice: Subject to any disclaimer, the term of this patent is extended or adjusted under 35 U.S.C. 154(b) by 432 days.

(21) Appl. No.: 12/121,054

(22) Filed: May 15, 2008

Related U.S. Application Data

(63) Continuation-in-part of application No. 11/971,832, filed on Jan. 9, 2008.

(51) Int. Cl.
*G06Q 10/00* (2006.01)
(52) U.S. Cl. .......................................... 705/321; 705/1.1
(58) Field of Classification Search ........................ 705/1
See application file for complete search history.

(56) References Cited

U.S. PATENT DOCUMENTS

| | | |
|---|---|---|
| 6,272,467 B1 | 8/2001 | Durand et al. |
| 6,275,812 B1 | 8/2001 | Haq et al. |
| 6,278,378 B1 * | 8/2001 | Feiner et al. ............ 340/815.45 |
| 6,658,400 B2 | 12/2003 | Perell et al. |
| 6,701,313 B1 | 3/2004 | Smith |
| 7,043,443 B1 | 5/2006 | Firestone |
| 7,191,176 B2 | 3/2007 | McCall et al. |
| 2002/0013735 A1 | 1/2002 | Arora et al. |
| 2002/0198801 A1 * | 12/2002 | Dixon et al. .................... 705/35 |
| 2003/0105642 A1 * | 6/2003 | Andino et al. .................... 705/1 |
| 2003/0229510 A1 | 12/2003 | Kerr |
| 2004/0267554 A1 | 12/2004 | Bowman et al. |
| 2005/0125259 A1 * | 6/2005 | Annappindi ....................... 705/4 |
| 2005/0131756 A1 * | 6/2005 | Benson .......................... 705/11 |
| 2005/0177408 A1 | 8/2005 | Miller |
| 2005/0192823 A1 * | 9/2005 | Kuhn et al. ....................... 705/1 |
| 2006/0036647 A1 | 2/2006 | Fichtner et al. |
| 2006/0100919 A1 | 5/2006 | Levine |
| 2006/0229896 A1 | 10/2006 | Rosen et al. |
| 2006/0229902 A1 * | 10/2006 | McGovern et al. ............... 705/1 |
| 2006/0265270 A1 | 11/2006 | Hyder et al. |
| 2007/0162507 A1 | 7/2007 | McGovern et al. |

OTHER PUBLICATIONS

Smith, William. "business intelligence: realizing the promise of HR technology". Workspan. Scottsdale: Nov. 2006. p. 45.*
Robert G. Valletta. "Changes in the Structure and Duration of U.S. Unemployment, 1976-1988". FRBSF Economic Review 1998, No. 3.*
Ignez M. Tristao. "Occupational Employment Risk and its Consequences for Unemployment Duration and Wages". Working Paper Series, Congressional Budget Office. Washington, D.C., Jan. 2007.*

* cited by examiner

*Primary Examiner* — Jonathan Ouellette
*Assistant Examiner* — Gabrielle McCormick
(74) *Attorney, Agent, or Firm* — Fulwider Patton LLP

(57) ABSTRACT

A method for grading a job seeker, relative to the universe of employed persons for a specified employment position, comprising the steps of establishing an interactive web site for remotely communicating with a user, displaying a series of queries to the user to survey a suitability of said user for a selected employment position, receiving input from said user in response to said queries, deriving a grade in relation to an index associated with a specific set of inputs in response to said queries, said grade reflecting a quantitative value of a suitability for a selected employment position, and displaying said grade within the context of the index, to said user, and system for carrying out said method.

26 Claims, 6 Drawing Sheets

Job search Intelligence
Home

About JSI

Program license

Demo

Contact

1. Select a general job description: —/— 100

9. What Range was your GPA for the degree you received: —/— 200

10. Years of work experience you have that is directly relevant to the job description: —/— 210

JOB SEARCH INTELLIGENCE

2. Specific job description: —/— 130

3. Desired geographic region: —/— 150

4. List of countries in California:

11. Your FICO score: —/— 220

230
12. Annual salary you will request:

5. Highest level of education achieved: —/— 160

6. degree you have (if any): —/— 170

If you have more than 1 degree, select the degree that is most relevant to the job description you have selected
7. State or province where degree was earned: —\— 180

8. School name: —/— 190

[Button]

120
[HealthCare ☐]

[3.0 to 3.9 ☐]

[10 to 14 ☐]

140
[Dental Assistants ☐]

[California ☐]

[Del Norte County ☐]

[700 to 799 ☐]

240  250
[Reset Query] [Submit]

[$36,000 to $44,999 ☐]

[MBA/MS or Intl. Equiv. ☐]

[Physical Sciences ☐]

[California ☐]

[California Arizona College ☐]

Your output values, seeking employment as a Dental Assistant in

Riverside County, CA

Market Ranking (1 through 10) — 255
Based upon the info that you provided, your Market Ranking is 5.5. The range of rankings for persons seeking the same Job Description in the same Geographic Region is 2.2 to 8.7, and the median ranking is 5.3

Salary Index — 270
There are 3,350 persons employed as Dental Assistants in Riverside, CA. The range of annual salaries for these persons is $20,270 to $39,220 with a median salary is $28,190

Based upon the info that you've provided, the market will likely offer you approximately $28,240 As a reference, a person who is gender neutral and race neutral would likely receive an annual salary of $29,710

Time Horizon Index — 280
The estimated number of weeks that you will be seeking employment as a Dental Assistant is 11

Alternative Field of Employment Index — 290
Based upon the info that you provided, it is recommended that you also consider employment in these Job Descriptions:

- Occupational Therapist Aides
- Medical Assistant
- Medical Transcriptionists

Best Region for My Qualifications — 293
The following regions of the US offer the most advantageous compensation conditions for your skill set, relative to the cost of living:

- Houston, TX
- Tampa, FL
- Portland, OR

READ THIS DISCLAIMER!! This program is offered to you for assistance only, and should not be relied upon as your sole source of information when seeking a job. Use this program to help you secure a new job 295 — [Reset Query]   299 — [Submit]

QUANTITATIVE EMPLOYMENT SEARCH AND ANALYSIS SYSTEM AND METHOD

RELATED APPLICATIONS

This application is a continuation-in-part of prior application Ser. No. 11/971,832, filed Jan. 9, 2008.

BACKGROUND OF THE INVENTION

The present invention relates to job search analytical tools, and more particularly to a method and system for job-seekers to quantitatively conduct self-evaluation and job qualification analysis for the purpose of being economically efficient in assessing career opportunities, using an interactive web site.

The task of conducting a job search is one that fills many people with dread and anxiety. A job hunt requires a major effort to research the many different opportunities available to the job seeker, filter those opportunities that are either undesirable or unattainable, and pursue a select few from the remaining positions. Much of the anxiety and frustration comes from the experience many people share of expending a significant amount of effort on the pursuit of a particular employment position, only to discover that the effort was wasted because the job-seeker is either unqualified for, overqualified, or in some manner a poor match in the eyes of the employer. All the effort that has been put into the pursuit of the job is for naught, and the entire process must be restarted on a new goal once the job-seeker realizes that he is not a good fit for the initial goal. This leads to frustration and disappointment in the process itself of finding a job.

Much of the anxiety, frustration, and wasted effort that job-seekers experience is a direct result of the job-seeker's unfamiliarity with the requirements and expectations of the potential employer for a given position. A job-seeker may feel that he or she is perfectly qualified for a given job, only to find out too late that a prospective employer typically seeks a more qualified individual for the position sought. Alternatively, the job-seeker may have the necessary qualifications but the job-seeker's salary expectations do not mesh with the employer's. Other factors may make the candidate a bad fit, such as geographical limitations, minimum on the job experience, educational background, etc. These conditions are at least in part due to the fact that the job seeker is unaware of where the job-seeker fits within a pool of other job seekers for the same position. Despite this longstanding problem, there is an absence of useful tools that would allow a prospective job applicant to conduct a self-evaluation of the prospects of obtaining a particular job before the effort of pursuing the job has occurred. Such a tool could alleviate much of the anxiety and frustration over the job search process by informing an applicant that either they are a good match for the position (and thus should actively pursue the job) or that they are a poor fit for the job (and should focus his or her efforts toward a more suitable position).

In many instances, a job-seeker is handicapped in his effort due to a lack of information regarding the market he is seeking employment in. Too often, the job-seeker is generally limited to performing research through job openings on job websites. Job postings tell the job-seeker what a fraction of the market is offering for compensation; not what the market is actually paying. Also, it may be difficult for a job seeker to estimate how much competition exists in the labor market, or how long the job seeker can expect to be seeking employment.

A job seeker may assume a considerable risk in pursuing a new job; sometimes quitting a job and moving to a new region of the country in search of employment. Furthermore, when the job-seeker does secure an interview opportunity, he is often handicapped in the negotiation process as he may not know the customary salary range for the specific labor market. The job-seeker may only know what the interviewing employer is offering. Conversely, the prospective employer is armed with the knowledge of what it pays its existing employees. All of the aforementioned difficulties that a job-seeker experiences are even more prevalent for those persons who are seeking lower pay/low qualifications types of jobs. Those people will not likely have the benefit of a professional employment recruiter that a professional person often uses. In many cases, a job seeker is hired for a job, accepting a salary that is less than market value, or the job seeker will remain unemployed for a longer period than necessary due to pricing himself too high for a specific position.

While job qualification tools exist, predominantly they exist for the employer's benefit to assist the employer in weeding through many job applicants for the same position. For example, U.S. Patent Application Publication No. 2004/0267554 (Bowman) is directed to an on-line job interview system where a prospective employer posts a job opening into a database, along with a job description and a list of job skills which are rated as required, preferred, or not required for the job. A potential employee accesses the database to identify a position of interest. He then ranks his own experience with the specific job skills set (expert, proficient, limited, or none) and inputs that data into the system, which then scores his input based on a scoring algorithm that applies weighted constants to the data. The employer then gets a list of all the job seekers, and sorts the list based on the scores from the on-line interview.

U.S. Patent Application Publication No. 2006/0265270 (Hyder) is directed to a job searching and matching system that gathers personal information from a job seeker and job description information from a prospective employer, and correlates the information looking for commonalities. Alternate suggested jobs are provided for consideration by the potential employer based on the correlations.

U.S. Patent Application Publication No. 2005/0131756 (Benson) is directed to an automated data collection and scoring system for screening potential job applications, that allows an employer to request data about an applicant from external sources (such as credit bureaus and employee references) and then automatically grades the data received according to a customized set of rules. The grades are compared to a pre-set scoring range to determine if the applicant meets, does not meet, or exceeds the criteria for the job. The characteristics used to evaluate an applicant may be adjustably weighted by the employer.

U.S. Patent Application Publication No. 2007/0162507 (McGovern) is directed to a bi-directional matching system which allows a potential employee to enter relevant qualifications information and attributes he is seeking in a position, and a prospective employer to enter relevant information about itself and an open position, as well as attributes the employer desires in a good match for the position. A matching system then compares the data entered by the job applicant with the open position in the system to generate a match level, which is reported back to both the potential employee and respective employer.

U.S. Pat. No. 7,191,176 (McCall) is directed to a data matching system that seeks to match job applicant data files with potential employer data files for particular job openings using a common language architecture, and by applying weighted characteristics to both job seekers and employers.

U.S. Patent Application Publication No. 2003/0229510 (Kerr) is directed to a method for recruiting skilled personnel by evaluating data submitted over a network using software configured to discriminate between potential applicants. An initial evaluation of all candidates against a core template of questions may focus an applicant pool. Only those prospective employees having qualifications meeting or exceeding those of the threshold standard continue on with the recruitment process. Kerr discloses the use of weighting multipliers corresponding to applicant answers appearing within a pulldown menu.

U.S. Patent Application Publication No. 2002/0013735 (Arora) is directed to a computer-based system for matching the preferences of potential employees and employers, using variable weighting selected by the system user.

Certain online systems currently available on the internet allow a job-seeker to enter variable data regarding his educational and employment history to assist the job-seeker in identifying job opportunities. Such websites may provide a range of salaries that are being paid for a targeted job in a specific region. However, these websites present substantial limitations for the job-seeker as they are collecting job-seeker data primarily for purposes of reselling it in aggregate form to the human resources department of large corporations. Consequently, the data gathered is derived from the pool of job-seekers that are the users of their respective systems. The data can be severely flawed for many reasons: extremely small samplings, biased samplings, redundant samplings, incomplete samplings, and samplings which rely upon large extrapolations; any of which can lead to incorrect output values for the job-seeker. Additionally, due to the fact that the data for these programs is derived from the job-seeker, inaccuracies or misrepresentations by the job-seeker when inputting their data will further undermine the data integrity. These programs often do not gather certain points of pertinent data that employers use when interviewing potential hires, such as: FICO score and the desired salary of a job-seeker.

From the foregoing, it can be seen that the bulk of the tools available to job-seeking applicants are designed to benefit the employer, and those that also serve the job seeker many times come into play only after the applicant has invested the time and effort to research and apply for the position. In such cases, the time savings to the job seeker may be minimal or nonexistent, and in any event the tools do little to allow the job seeker to properly conduct a self-evaluation of the prospects for a given position at the outset of a job search. In addition, many of the systems described above that are intended to benefit the job seeker are confined to a particular employer or position, rather than a job description in general. Accordingly, there is a need in the art for a tool that allows a job seeker the opportunity to fully measure the prospects of obtaining a position in a selected field before the job seeker has put forth the time, effort, and resources, and emotional investment in a job search.

SUMMARY OF THE INVENTION

The present invention is a system and method for querying a job seeker on various criteria relating to their education, work experience, and other personal information that is generally requested by prospective employers. The job-seeker is required to select a precise job description, and the geographic region of the country in which they are seeking employment, and other factors that would typically be asked of a job-seeker, by a prospective employer. Based on said querying, a computer program then generates a numerical grade, and an index. The grade and index allow the job seeker to reference themselves against other persons (peers) who wish to be similarly employed. In a preferred embodiment, the job seeker may also see the number of persons he is competing against for a specific job description, within a specific geographic region.

The program of the present invention, which preferably resides on a web site geared to attract job searchers, also preferably determines a recommended salary, within the salary range of persons already employed within a specified job description and within a specified geographic description. The program also preferably provides an estimate of the expected duration the job search will last for a particular job-seeker which is based upon the query responses. In this case, the program's algorithms integrate the query responses with retrieved labor market data. In another preferred embodiment, the program can prioritize the best regions of the country in terms of economics for the particular job seeker, evaluating salary, economic trends, and employment trends. An unbiased listing of the best regions is displayed to the job-seeker based on a predetermined formula. In a preferred embodiment, the program will also suggest an alternate employment field if the candidate is ill-suited for the initially selected job description, or if the selected job description or geographic region targeted are economically distressed, relative to other plausible employment opportunities available in the market. The program can also output salary projections in yet another preferred embodiment based upon various factors, such as gender, ethnicity, and prior employment history.

The aforementioned functions provided to the job-seeker are believed to be of heightened integrity as the program has been written for the benefit of the job-seeker, and the source data for the program is preferably derived primarily from government sources such as the United States Bureau of Labor Statistics. The foregoing allows data sets of statistically large samples, which enables the program to construct an accurate index and grade within the index. Additionally, economic trending attributes are applied in a quantitative manner via the programs algorithms, to the data, to provide practical economic value in the form of outputs which are provided to the job-seeker. The invention can further be linked to job referral web sites to help job seekers find jobs once it has been determined that the sought after position is a good fit for the job seeker. A secondary benefit of the resultant database of job-seeker data is that employers can use the program's database of stored grades to identify the highest graded job-seekers and hand select those job-seekers to greatly reduce the employer's search. The employer can customize the program as well to access specific values that would suit the employer's particular requirements, or use the default grades of the program.

Other features and advantages of the invention will become apparent from the following detailed description, taken in conjunction with the accompanying drawings which illustrate, by way of example, the features of the invention

BRIEF DESCRIPTION OF THE DRAWINGS

FIG. 1 is an illustrative screen shot of a web page showing a series of survey questions and pull down menus for a job seeker;

FIG. 1b is a continuation of the logic diagram of FIG. 1a;

FIG. 2 is a results page illustrating an exemplary index/grading system and other output data of the program;

DETAILED DESCRIPTION OF THE PREFERRED EMBODIMENTS

Figure 1A:
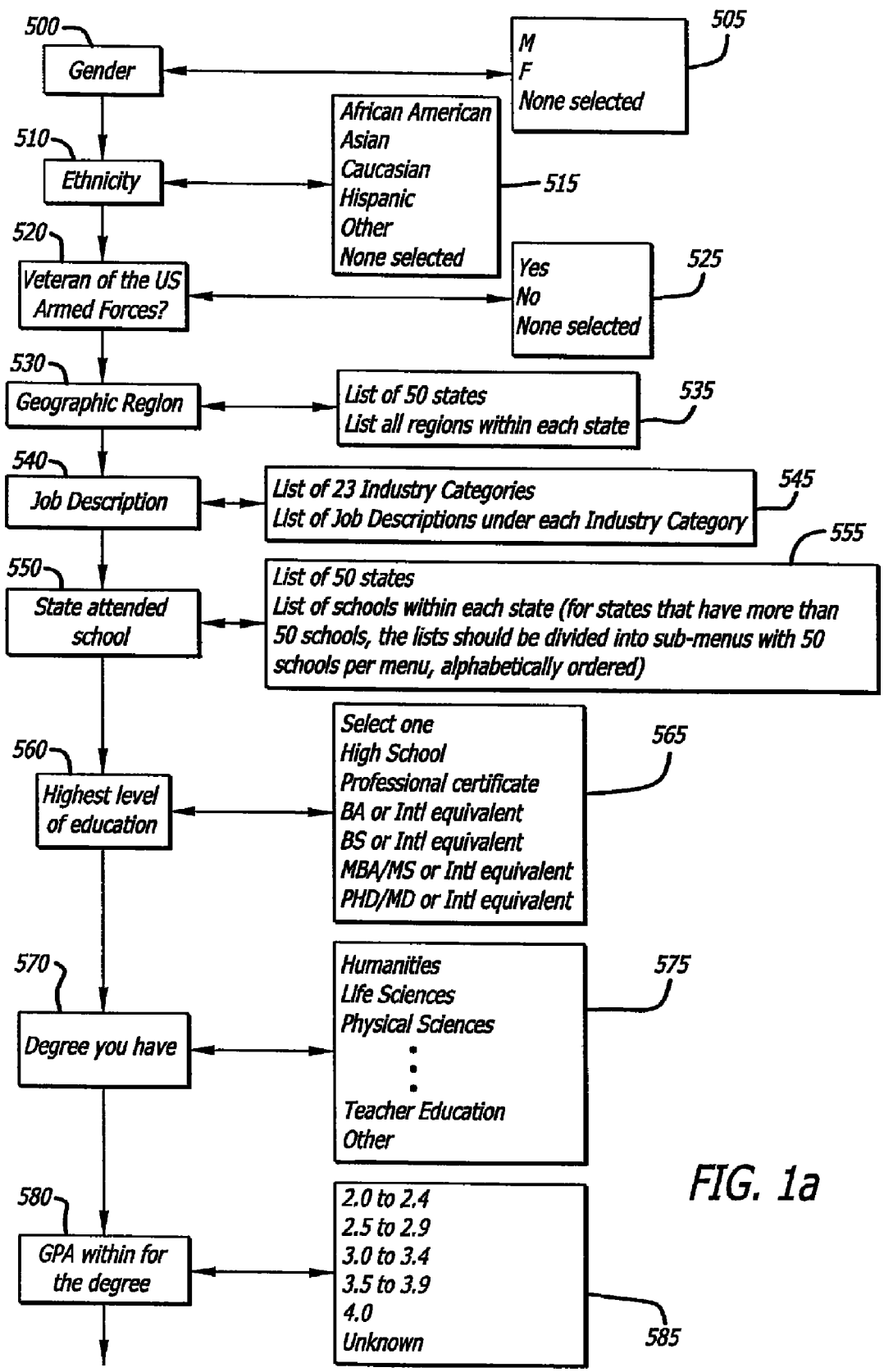
FIG. 1a is a logic diagram of the various pull-down menus that can be implemented into an alternative version of the web page of FIG. 1.

The present invention is a system and method embodied in a software program that resides on a job search web site. The program performs an evaluation of a job-seeker for a specific selected employment position, preferably for a designated geographical area, and based on a series of algorithms that use factors, multipliers, and weighting formulas, determines an output value (grade) for the job-seeker. The grade can be used by the job-seeker within the context of an index to evaluate whether the selected job description, geographic region, target salary and time horizon to secure employment meets with the job-seeker's expectations and needs. The program is based on a multi-tiered information base that uses personal information culled from a job seeker survey as well as job specific data from various public databases to calculate a grade within a range (index) for a particular job description. The resultant grade serves as a barometer for a given job description in a designated geographic region, and serves as a comparison of the job-seeker's likelihood of obtaining the job against other potential applicants.

A web site hosting the program of the present invention is typically accessed through a log-on identification and password system, possibly on a subscription basis. The job-seeker logs into the program via the web site, which will typically be associated with, or linked to, an affiliate job referral website. The job seeker initially selects a job description from a first pull down menu, which may be followed by additional pull down menus to narrow the search to a particular job. For example, the first pull down menu may have choices which represent general employment categories, such as: "sales," "legal," "government," "medical," and "computers." Once the initial selection is made, e.g., "sales", a second pull down menu can narrow the description to a more precise designation, such as "retail," "telemarketing," "real estate," "industrial," etc. For purposes of standardization and accuracy, the job descriptions represented by the system are preferably identical to those utilized by the US Bureau of Labor Statistics. Once the initial questioning is complete, a job description corresponding to the job seeker's answers is defined. The program then surveys the job seeker on relevant personal data that determines the prospects of success in a job search, such as the job-seeker's educational background, employment, personal history, geographical area, and salary expectations. Each question may be answered by moving a cursor to reveal the pull-down menu of answers and clicking on the appropriate response. Each response to a question causes a new question to be displayed on the display, with the entire survey constituting approximately ten to twelve questions. Each selected response is stored by the program in a memory for further execution by the associated algorithms.

Once the job seeker has completed the survey, he selects the "submit" button and the program initiates, loading the job-seeker's responses into the algorithms and executing a series of mathematical operations described more fully below. The program preferably derives four separate categories of information to be displayed to the job-seeker. This information can then be utilized by the job-seeker to evaluate the prospects of obtaining the desired position as well as an estimate of the duration of time the job-seeker can expect to locate the job, a target salary, as well as alternate job fields.

The algorithms create the output for display to the job-seeker by incorporating the job-seeker's answers to the survey along with data from various research entities having statistically relevant raw data regarding employment and compensation conditions for a given geographical area. One such source of employment data is www.bls.gov, but other data sources also may be used. The program then merges the job-seeker's answers into one or more algorithms that compare the availability of the sought after position, the range of salary for the position, the average experience for the position, the number of applicants for the position, and other relevant data and assigns a value to the job-seeker's prospects for obtaining the job. The value can be adjusted higher or lower by modifications to the target salary input data by the job-seeker, so the job-seeker can see the level of elasticity and dependence of this factor in the overall result. That is, the job-seeker can evaluate, for example, the effect of asking for $40,000 per year versus $50,000 per year will have on his prospect for securing employment. After the modification, the program returns a new grade that reflects how much the modification changes the outlook for obtaining the position. The job-seeker can also see how many persons they are competing against, for the same job description, in the same geographic region of the country.

The information output by the program can preferably be categorized into four different outputs that are displayed to the user. The first output is a numerical grade of the job-seeker's prospects for obtaining the desired job on a scale of 1 to 10. The grade is based upon the educational, employment and personal information provided by the job-seeker, which is referenced against applicants for the same job description in the same geographic region. This grade is compared to an index, which is the range of grades achieved by all the job seekers looking for the same job in the same geographic region at the same time. The results are presented as a statistical representation of where the job seeker's grade falls on the index, i.e., $25^{th}$ percentile, 37.5 percentile, median, 62.5 percentile, and $75^{th}$ percentile for the same job description in the same geographic region. This unique ranking system provides the job searcher with a quick evaluation of whether the selected job is obtainable and where the job-seeker ranks on a statistical basis. That is, if the job-seeker achieves a grade that falls in the $25^{th}$ percentile for a job description, the job-seeker may choose to focus his or her efforts on a different position before expending time and energy toward a position with a poor chance for success. A low grade may also imply that the job-seeker's target salary is too high, relative to their employable assets.

The second output determined by the program is an estimate of the number of weeks that the job-seeker can expect to conduct the job search in the specific region. The estimate is based on information provided by the job-seeker and the job-seeker's grade within the index, in combination with statistics on job availability, relating at a macro-economic level to overall economic and labor market factors, and at a micro-economic level relating to economic and labor market factors for a specific job description and geographic region. Additional trending and projection algorithms and numerous other factors affecting the statistical analysis of a job search are applied by the program to create the output values. The ability to estimate the duration of a job search can be a valuable tool in setting expectations for the job-seeker and preparing the job-seeker for the timeframe needed to successfully seek the position.

The third output of the program is a salary range for the sought position in a given geographic region, and a target salary based on the job-seeker's grade and statistical data, which are then repurposed by additional algorithms. The algorithms used apply values derived from: employment trends, unemployment rates, absolute numbers of persons employed in specific job descriptions and geographic regions, salary trends, micro-economic factors and macro-economic factors, and other factors. The salary range provided to the job-seeker is further broken down into statistical gradients, such as $25^{th}$ percentile, 37.5 percentile, median, 62.5 percentile, and $75^{th}$ percentile. The salary range and target salary can be an invaluable tool in both setting the expectations of the job-seeker for the position, as well as giving the job-seeker a guide in interviews or job applications for the expectations of hiring employers in the region.

A fourth output of the program is a listing of the five different regions of the country that are the most economically advantageous to the particular job-seeker. A formula can be used that takes the median salary for a selected job description, within each region of the country, and divides the salary by the Consumer Price Index (CPI). This results in a value that also takes into account the cost of living for that region. This value can then be multiplied by a factor corresponding to the employment rate for that region of the country. The five regions of the country are then presented to the job-seeker in a list with the most favorable region on top and the least favorable region on the bottom.

The fifth output of the program is an alternate field of employment for the job-seeker to consider in his or her job search. In many cases, job-seekers may not be aware of alternate employment fields that better suit the job-seeker's background and experience or salary expectations. As part of the output of the program, alternate fields are presented based on the job-seeker's responses to the survey questions. In many cases, the job-seeker will be made aware of opportunities for which he is far more qualified, or closer to his geographic or compensation expectations. This alternate field of employment is based on key answers, particularly where the job-seeker achieves a low grade in the sought after position or appears uniquely qualified for a different position. This function will also serve to notify a job-seeker when they are seeking employment in a deteriorating industry, or in a economically depressed region, or both.

The results of the survey and the program's output to the job-seeker are stored in a database that can be accessed by subscribing employers to evaluate the talent pool of job seekers in the designated geographic region. Using the grades of the job seekers, employers can rapidly evaluate large numbers of prospective employees and hand pick the most qualified applicants for specific positions. The ranking system is an invaluable tool that allows the employer to quickly scan a large number of job-seekers to find the best fit, based upon the employers specific needs for certain employable assets. That is, a job-seeker may have the necessary qualifications and without being overqualified for a position, along with mutual salary expectations and geographic proximity. That job-seeker will have a higher grade than a job-seeker with an expanded educational background but unreasonable salary demands. In this case, the grading system provides a benefit to both the job-seeker and the employer in locating the perfect position/employee match. Moreover, the employer can assign a priority to a particular employee characteristic and adjust the default grading of the job-seekers according to the employer's specific search criteria, greatly reducing the time spent by the employer reviewing job applicants and interviewing prospective employees.

An exemplary algorithm for determining a job-seeker's grade within an index is illustrated below. It is understood that the values of the various factors can be changed, and in fact some factors may be added or deleted without departing from the scope of the invention, but the concept for determining a grade as well as the other program outputs can be readily discernable from the examples presented below.

1 Employment Grading Index (EGI)

Job Description Targeted—The job-seeker logs into the program and selects from a list of job descriptions that are shown in a drop down menu. The program then applies a numerical value of 0.1 to the job description selected. For purposes of standardization, job descriptions are preferably listed by names utilized by the U.S. Bureau of Labor Statistics, and are identified by a 7-digit Standard Occupation Classification (SOC) code assigned to each job description.

Geographic Region—The job-seeker uses a pull down menu to select from a list of geographic regions, beginning with states, and then a county, that the job-seeker is targeting for employment. The system applies a numerical value of 0.1 to the geographic region selected.

Degrees & Relevance of Degrees—The job-seeker uses a pull down menu to select the education level achieved and/or degree(s) earned. The program determines the relevance of the degree selected in relation to the targeted job description. The valuation is determined by levels. For example, relevance is assigned a value of 1.4 if the relevance is "direct", 0.6 if the relevance is indirect, and 0.3 if the relevance is nil. A 0 is assigned for no degree. A Bachelor of Arts degree or international equivalent is assigned a value of 0.3, and a Bachelor of Science degree or international equivalent is assigned a value of 0.6. An Masters degree or international equivalent is assigned a value of 1.0, and a PhD or M.D. or equivalent is assigned a value of 1.6. These values can be adjusted for a particular job description as appropriate. For example, a particular job may place a higher relevance on a Bachelor of Arts degree than a Bachelor of Science degree. Accordingly, the values assigned to each degree can vary from position to position.

School Attended—All colleges and universities are listed under the state in which they are located. The job-seeker selects from a drop down menu the state where the school bestowing the degree is located. This generates another drop down menu showing all colleges and universities found within that state. The job-seeker then selects from the pull down menu the school attended from the list of schools and universities. This generates another drop down menu showing all degrees offered by the school selected. In this manner, the job-seeker selects the school and degree earned. In the case where a job-seeker possesses multiple degrees, the job-seeker will be instructed to select the degree that is most relevant to their desired job description. In the case where a job-seeker possesses any foreign degree(s), a drop down menu appears to enable the job-seeker to select the country from which they graduated within and a pull down menu to select the U.S. equivalent degree.

In some cases a value may be assigned for selected schools having particular excellence in a given field. For example, an Ivy League School may be assigned a value of 1.4, selected tier 2 schools have a value of 1.2, school characterized as tier 3 schools a value of 1.1, and other schools have a value of 1.0. The program will assign the value when the job-seeker selects the school attended.

Grade Point Average—The following values may be applied by the program for a given grade point average earned by the job seeker: 2.0 to 2.4=0.3; 2.5 to 2.9=0.6; 3.0 to 3.4=0.9; 3.5 to 3.9=1.1; 4.0=1.4; and unknown=0.1.

Years of relevant work experience—The job-seeker can select from a drop down menu the number of years of relevant work experience he or she possesses, with values assigned as follows: none=0.1, less than five years=0.3, five to ten years=0.5, ten to fifteen years=0.8, fifteen to twenty years=1.2, and more than twenty years=1.5.

FICO Score—Employers have recently turned to credit scores in their assessment of job applicants. The program recognizes this by assigning the following values as applicable: <500=0.2; 500 to 599=0.5; 600 to 699=0.7; 700 to 799=1.0; >800=1.3; and unknown=0.1.

Recent Employment—The number of jobs that a job-seeker has had over a given time period, such as for example the last seven years, can also be incorporated into the grade. The program asks the user to enter a number of jobs that the job-seeker has held, from zero through five or more. The program then assigns, by way of example, a value to the overall grade as follows: none=−0.3; 1=1.0; 2=0.8; 3=0.0; 4=−0.3; and 5+=−1.0.

Target Salary—A value for this component is dynamically generated by comparing the target salary of the job-seeker to the target salaries of other applicants who are searching for employment with the same job description in the same geographic region as the job-seeker. A program will sort all applicants who are searching for employment with the same job description in the same geographic region as the job-seeker into 5 categories, generated by the salary ranges presently existing in the database: Low 20%=1.2; Low mid 20%=0.8; Middle 20%=0.0; Mid high 20%=−0.3; and High 20%=−1.0. In the absence of sufficient comparative data, the program will assign a neutral value of 0.0.

The values for each of the 9 categories listed above are summed to create a numerical grade for the job-seeker, which is used to represent their position within a grading index. Other factors that may also be incorporated into the determination include prior bankruptcies, criminal records, age, gender, marital status, property ownership, and ethnicity. The maximum value of the examples provided above is 11.0, creating essentially a scale between 0.1 and 11.0. The grade of each job-seeker can be compared to the scale or index, as well as a statistical model in terms of twenty percentile increments for ease in interpreting the results.

2 Time Horizon Index (THI) Relates to Job Search Expectancy

The estimate for the duration expectancy of the job search considers several factors. The first factor is the job description targeted. There are 3 categories of job description, which are delineated by skill level. Each skill level has a range attributed to it, which represents the timeframe that a job-seeker will expend in attempting to secure employment. The program utilizes the following baseline categories in establishing a timeframe that applicants within these skill levels will require to secure employment: low skill positions will have a range of zero to ten weeks; moderate skill positions will have a range of zero to twenty weeks; and high skill positions will have a range of zero to fifty-two weeks. Every job description will be assigned a skill level.

From this baseline many other factors are considered to refine the estimate. The second factor is the national employment trend for the specific job description. If the total number of persons employed nationwide in the job description specified increased year over year by greater than 10%, the expected duration is decreased by eight weeks. If the total number of persons employed nationwide in the job description specified increased year over year by greater than 4% and less than 10%, the expected duration is decreased by three weeks. If the total number of persons employed nationwide in the job description specified decreased year over year by greater than 4% and less than 10%, the expected duration is increased by three weeks. If the total number of persons employed nationwide in the job description specified decreased year over year by greater than 10%, the expectancy is increased by twelve weeks.

The third factor in assessing an estimated job search concerns the employment data for a specific geographic region, i.e., the total number of persons employed in a specific job description within specific geographic region. For example, in a particular county if the number of employees in the specific job is 0 to 24 persons, the program adds ten weeks to the expected job search estimate; 25 to 99 persons adds eight weeks; 100 to 999 persons adds six weeks; 1,000 to 9,999 persons adds two weeks; 10,000 to 99,999 persons adds one week; and >100,000 persons adds zero weeks to the estimated job search.

The fourth factor related to the job search estimate concerns the percentage of the workforce unemployed within a specific geographic region. For a regional unemployment rate of 10% or greater, the program adds twenty weeks to the estimated job search; an unemployment rate of 8% to 9.9% adds sixteen weeks; an unemployment rate of 7% to 7.9% adds twelve weeks; an unemployment rate of 6% to 6.9% adds ten weeks; an unemployment rate of 5% to 5.9% adds eight weeks; an unemployment rate of 4% to 4.9% adds four weeks; an unemployment rate of 3% to 3.9% adds two weeks; and an unemployment rate of 2% to 2.9% adds one week.

Another factor is the unemployment trend in geographic region targeted on a year over year basis. That is, where the employment rate is increasing annually then the program subtracts five weeks from the expected job search; a decreasing employment rate adds five weeks; and a stable employment rate results in no change to the estimated job search duration.

Another factor that goes into the predicted job search is the turnover in the total U.S. employment market as represented by the hire rate on a percentage basis, per month. That is, if the turnover percentage is less than 2.8%, the program adds five weeks to the estimate; if the figure is between 2.8% and 3.3%, two weeks are added; and if the figure is 3.3% or greater, zero weeks are added.

Yet another factor that influences the predicted job search duration is wage pressure (or lack thereof) in a particular geographic region targeted. The data for this is created by comparing year over year figures for a specific geographic region. If wages increased for a specific job description in a specific geographic region by more than 10% when compared to the year prior, the program subtracts eight weeks. If wages increased for a specific job description in a specific geographic region by more than 4% and less than 10% when compared to the year prior, the program subtracts three weeks. If wages decreased for a specific job description in a specific geographic region by more than 10% when compared to the year prior, the program adds ten weeks to the estimated job search. If wages decreased for a specific job description in a specific geographic region by more than 4% and less than 10% when compared to the year prior, the program adds five weeks. If wages for a specific job description in a specific geographic region did not increase or decrease by a figure greater than 3.9% when compared to the year prior, there is no change in the estimate.

Seasonality—Job opportunities in certain industries will be affected by the time of year at which they are seeking work depending upon the job description targeted. For example, retail job opportunities will increase in the months of September through December, and decrease in the other months of the year. Farm employment opportunities will be greater in the months of March through September. Other seasonality factors will require adaptation of the program to reflect the influence on the timeframe that job seekers will allocate to secure employment.

Rank—A low grade within the index of the specific job-seeker increases the estimated timeframe estimated to secure employment, and a high grade decreases the timeframe estimated that an job-seeker will be seeking employment. For example, a grade of 1 to 1.9 results in a multiplier of 2.0 to the number of weeks the job-seeker will search for a job; a grade of 2 to 3.9 results in a multiplier of 1.6; a grade of 4 to 5.9 causes a multiplier of 1.0; a grade of 6 to 7.9 results in a multiplier of 0.9; and a grade of 8 to 9.9 leads to a multiplier of 0.5. The programs output value will not ordinarily be less than 0 to 5 weeks, when providing an estimate.

3 Comprehensive Salary Index (CSI) Relates to Earnings Potential

The job-seeker's grade places the job-seeker within a percentile range (not less than 25% and not greater than 75% of the entire range of salaries paid for a specific job description in a specific geographic region) for use in determining a salary expectation that is realistic for the job-seeker's qualifications and experience. For example, a grade of 1 to 1.9 results in a percentile of 25% of all salaries for a specific job description in a specific geographic region. A grade of 2 to 3.9 results in a percentile of 37.5%; a grade of 4 to 5.9 results in a median salary expectation; a grade of 6 to 7.9 qualifies for a 62.5% percentile salary; and a grade of 8 to 9.9 results in a 75% percentile for a specific job description in a specific geographic region.

Additional data from the program's earnings potential model may include: the median hourly wage for a specific job description in a specific geographic region; the median annual wage for a specific job description in a specific geographic region; the hourly tenth percentile wage for a specific job description in a specific geographic region; the annual tenth percentile wage for a specific job description in a specific geographic region; the hourly 25th percentile wage for a specific job description in a specific geographic region; the annual 25th percentile wage for a specific job description in a specific geographic region; the hourly median wage (or the 50th percentile) for a specific job description in a specific geographic region; the annual median wage (or the 50th percentile) for a specific job description in a specific geographic region; the hourly 75th percentile wage for a specific job description in a specific geographic region; the annual 75th percentile wage for a specific job description in a specific geographic region; the hourly 90th percentile wage for a specific job description in a specific geographic region; and the annual 90th percentile wage for a specific job description in a specific geographic region.

The program also outputs the recommended target wage on an hourly basis and annual basis to the job-seeker for a specific job description in a specific geographic region. The recommendation is tied to the job-seeker's grade in relation to the other job seekers in the databases who are applying for the same job description in a same job description in a same geographic region. The program will not provide a salary recommendation that is lower than the legal minimum wage for any region.

Salary projections can also be tied to statistical data relating to gender and ethnicity. For example, in a preferred embodiment the program can ask the user to input a gender of the job-seeker, such as "M" for male, "F" for female, and "N" for none selected. Based on the response, the program weighs the projected salary output based on statistical data and assigns a multiplier for the three responses. For example, a response of "M" results in a salary multiplier of 1.09 whereas a response of "F" results in a multiplier of 0.92. An "N" response results in no multiplier, or more correctly a multiplier of 1.0. It is important to recognize that the salary weighting does not affect the job-seeker's grade but rather is solely a factor that is part of the salary forecasting. The gender weighting can also be cancelled or the user can request both a gender biased and gender neutral salary output.

In the same way that gender can statistically affect one's salary, ethnicity data can also be used to refine the salary forecast based on large data samples. Salary adjustments for ethnicity is supported by government data that demonstrates that certain ethnicities statistically earn a salary that is more or less than the average salary for certain positions. The job-seeker can utilize this data in the job search by selecting from a pull-down menu a listing of ethnic backgrounds such as African American, Asian, Caucasian, Hispanic, Other, and None Selected. Based on large data samples, a multiplier is assigned for each ethnicity. For example, if it is determined that Asians tend to earn salaries that are four percent higher than other ethnicities, then a multiplier of 1.04 can be assigned to salary projections where the selected ethnicity is Asian. By further way of example, "Caucasian" could be assigned a value of 0.99, Hispanic could be assigned a value of 0.93, and African American is multiplied by 0.91. Other multipliers can be assigned to other ethnicities based on statistical data or other information. As with gender, the multiplier does not affect the job-seeker's grade but rather the statistical salary projection, and the multiplier can be turned off or the user can request both ethnicity-weighted and ethnicity-neutral salary projections.

4 Most Desirable Geographic Region

Economic factors can sometimes skew raw data on salary figures, so some job-seekers may look to which geographical regions provide the best economic conditions before initiating a job search. In a preferred embodiment, the program establishes a listing of geographic regions ordered for a particular job-seeker based on the specific position sought, the median salary of that position, and the consumer price index (CPI) of that region. For example, the median salary of a purchasing manager is $89,820. The CPI for Tampa, Fla. is 98.1, according to the U.S. Census Bureau at www.census.gov. The median salary $89,820 is divided by the CPI of 98.1 to yield a value of 915.60. To this value, an employment growth trend is then factored in. For example, if the year over year total employment rate for the targeted geographic region increases by 1.1% to 3.0%, a multiplier of 1.0 is applied to the 915.60 value. If the year over year total employment rate for the targeted geographic region increases by 3.1% or more, a multiplier of 1.05 is applied to the 915.60 value. If the year over year total employment rate for the targeted geographic region increases by less than 1.0% or more, a multiplier of 0.90 is applied to the value. The geographic regions are then ordered from highest to lowest, representing the most favorable to least favorable geographic regions for the selected job-seeker's position.

5 Alternative Fields of Employment Index (AFEI)

Recommendations as to an alternative job opportunities for the job-seeker to consider will also be provided to the job-seeker when the program ascertains that the job-seeker is not applying their educational background and/or other attributes to the most appropriate field, and/or the job description being targeted by the job-seeker has low employment opportunities and other more promising employment opportunities exist under other job descriptions. The program will make recommendations to the job-seeker to seek employment in an alternative job description, if one of the following conditions are present in the original job description selected: if the total number of persons employed within a specific job description declines by more than 5% on a year over year basis; if the median compensation for a specific job description declines by more than 5% on a year over year basis; or if seasonality factors will have a significant negative impact on a job-seekers timeframe to secure employment for a specific job description. The alternative job descriptions will be determined by the program by evaluating a job-seeker's educational background, work experience, salary expectations, geographic region, job availability, and other relevant factors. The default recommendations provided by the Alternative Fields of Employment Index are alternate job descriptions, within the same general geographic region selected by the job-seeker. However, an option will exist via clicking on a web-link that will enable a job-seeker to view their desired job description, in regions of the country that present better economic opportunities, based upon data from the Time Horizon Index.

The administrator of the program can, on an as-needed basis, or when extra-ordinary events occur, override the standardized values within the program, to provide quality results. Microeconomic factors and industry factors (large employer closes factory, industry downsizing, etc) may not yet be represented in the above criteria or published data, necessitating some manipulation of the program. Macroeconomic factors also may influence the timeframe to secure a job, but there may not be any available data to support a systematic implementation to modify the predictor; therefore, manual intervention may be necessary to create an accurate prediction. For example, a specific geographic region may have a high unemployment rate, yet the job-seeker, could be seeking employment within a narrow segment of the market that is not influenced by the immediacy of market forces in the job market, such as government employment. Other examples of macroeconomic factors include subsidies and artificial market supports which distort data, geographic regions that are close to borders can be influenced by undocumented workers, currency fluctuations, trade factors, etc.

6 Job Search

The program and web site can preferably be linked to an affiliate web site where employers can post available job listings and applicants can forward a job application or resume via the affiliate web site. The two web sites may establish a symbiotic relationship where a job seeker may first conduct a self-evaluation of possible job openings, and then based on the results of the program of the present invention, expend the effort and resources to conduct a job search on the affiliate web site, complete with tailored resumes and job interviews. The job-seeker who has first utilized the present invention can assure himself that, upon achieving a grade of satisfactory level within the computed index, he will not be wasting his time and effort on an unachievable position. The job-seeker can enter the market with an informed perspective of his opportunities in the job market. The program will provide him with a 'snapshot' summary of: labor and wage conditions, in addition to the benefit of knowing how he compares to others in the labor market he is targeting. The web site of the present invention may alternatively be equipped with a "web crawler" software that searches the internet for job listings and collects those listings for display to the job seeker. The web crawler uses key words to identify job listings and can find available positions for the job seeker in the job descriptions determined to be the best fit for the job-seeker. As yet another alternative, the web site may directly solicit and post job listings from prospective employers, or a combination of all three approached may be utilized.

A representative screen shot of the web site employing the computer program of the present invention is illustrated in FIG. 1. After viewing a welcome page that asks the user to type a username and a password to access the program, a series questions and pull down menus are presented to the user in a predetermined sequence and the user answers the question by clicking on the appropriate option. For example, question 1 asks the user to select a general job description 110. The user accesses the pull down menu and selects "health care" 120. Question 2 asks for a specific job title 130 and the user again accesses the pull down menu and selects "dental assistants" 140. This process continues with the remaining questions, which include geographic region 150, educational level achieved 160, degree 170, college's state 180 and name 190, GPA 200, work experience 210, FICO score 220, and salary 230. Each of these inquiries are followed by a displayed pull down menu to select the appropriate responses. At the conclusion of the survey, the job-seeker is prompted to select either "reset Query" 240 or "Submit" 250. If "submit" is selected, the program initiates to run the algorithms and generate the output shown in FIG. 2.

Figure 1B:
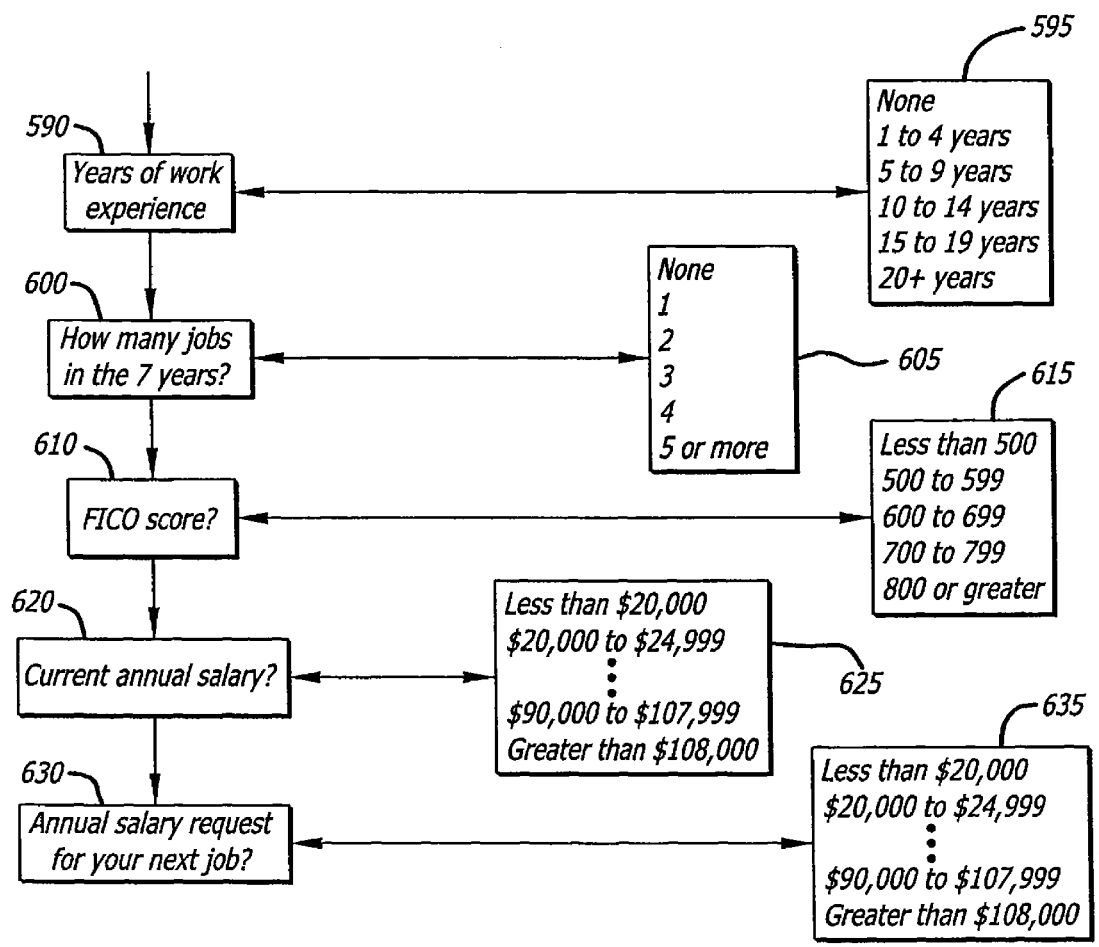

FIGS. 1a and 1b illustrate logic diagrams that can be implemented into an alternative version of the web page of FIG. 1. For example, a first question to be answered is "gender," reflected in box 500. Box 500 corresponds to its own pull-down menu reflected in box 505, which includes the answers "M", "F", and "None selected." The user clicks on the pull down menu to reveal the possible responses, and then clicks on the response to enter the selected gender into the program. The next inquiry is "ethnicity," reflected in box 510, with corresponding pull-down menu of responses shown in box 515. Military service is shown in box 520, along with the responses in box 525. Geographic region 530, job description 540, and school attended 550 all follow along with their corresponding pull-down menus 535, 545, 555, respectively. The user then clicks the highest level of education 560 and clicks on the appropriate level in the pull-down menu reflected in box 565. The user can enter the type of degree in box 570 using pull down menu 575, and his or her GPA 580 using pull-down menu 585. Continuing on FIG. 1b, the number of years of work experience in the field is entered at box 590 using pull-down menu 595, and the number of jobs held by the user is entered at box 600 using pull-down menu 605. The program can also use the applicant's FICO score at box 610 using the pull-down menu in box 615 and current annual salary 620 using pull-down menu 625 in creating the grade. Finally, the requested salary 630 is entered using the pull-down menu 635 to complete the logic diagram.

FIG. 2 illustrates an exemplary output of the program based on the input shown in FIG. 1 The first data displayed by the program is a market ranking 255 showing the ranking of the job seeker based on the responses to the questions posed above. The ranking is provided along with a maximum and minimum values for applicants of that position, as well as a median ranking. In the example of FIG. 2, the job seeker's ranking is 5.5 in a range between 2.2 and 8.7. The median ranking is 5.3. showing the number of present people working in the selected employment position in the designated geographic area. In the example shown in FIG. 2, the job-seeker's grade of 5.5 is slightly higher than the median grade of 5.3 for the selected region. The next output of the program is the salary index 270. The salary index 270 gives the total number of persons employed in the selected area and a salary range of the highest and lowest salaries. The salary index 270 provides a projected salary based on the job seeker's specific ranking, and a comparison with a race neutral and gender neutral job applicant. The next output is the Time Horizon Index 280 that projects the duration of the job search for the job seeker based on the job seeker's ranking for the given position in the given region. In the example of FIG. 2, the job search is anticipated to be eleven weeks. The next output of the program is the Alternative Field of Employment Index 290, where alternate employment possibilities are presented by the program. Here, the program suggests that the exemplary job-seeker consider work in the occupational therapy field, as a medical assistant, and medical transcriptionists based on the job-seeker's personal data and the geographic region, job availability, etc. The next output of the program is the Best Region for My Qualifications 293, which identifies the most advantageous region for the job-seeker for compensation conditions taking into consideration the cost of living. In the example, the job seeker's qualifications and background suggest that the most advantageous regions are Houston, Tex., Tampa, Fla., and Portland, Oreg. Finally, the program allows the user to "Reset Query" 295 to dynamically determine how changes in the input data affect the output data. Alternatively, the job-seeker armed with the ranking and salary information can now access various job listing web sites located on the web site or activate web crawler or search engines to find job listings in the selected field by clicking on the submit button 299.

Figure 3:
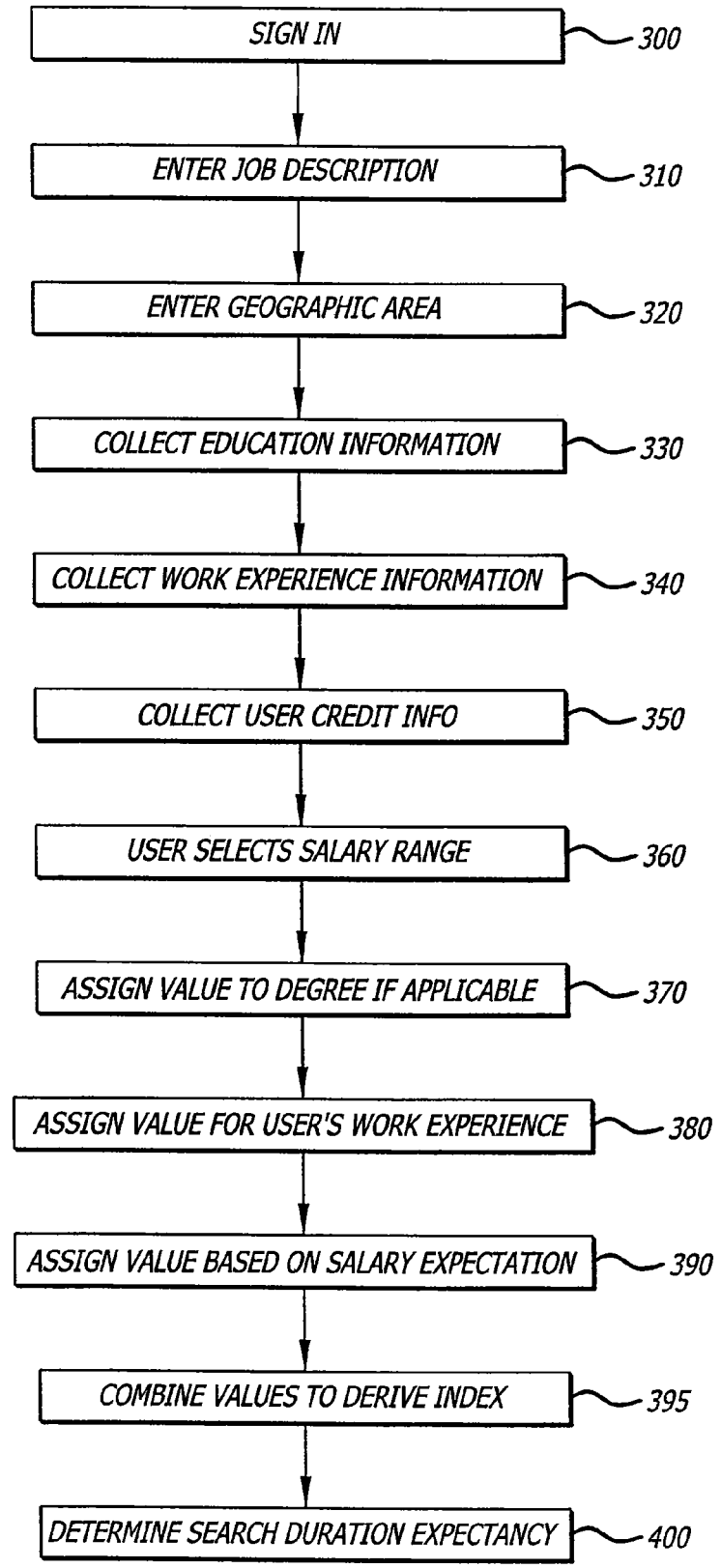
FIG. 3 is a flow chart of the steps carried out by the program to determine the user's grade for securing a particular job in a designated geographic location.

FIG. 3 is a flow chart of the steps carried out by the program to determine the user's grade and index characterizing the prospects of securing a particular job in a designated geographic location. Initial step 300 corresponds to a log-in of the user, which occurs when the user accesses the web site running the job evaluation program and supplies the necessary user name and password identification. Once logged in, the next step 310 is to enter the job description using one or more pull-down menus, followed by a step 320 of identifying a specific geographic area by state and county. After identifying a job description and geographic area, the next step 330 is to collect personal education data about the job seeker, such as education level achieved, college degree earned if applicable, school attended, and grade point average. Step 340 follows in which work experience data is collected from the user, and step 350 requests that the user enter his credit information such as FICO score. The last pull down menu is step 360, where the user selects a salary range sought.

With the information entered, the program begins the calculation steps to derive the index and grade, as well as additional program output. In step 370, the program assigns a value to the user's degree if applicable based on predetermined stored values for each degree and university, taking in to consideration the relevance of the degree to the position sought and the user's grade point average. The next step 380 is to assign a value to the user's work experience by determining which predetermined range the user's experience falls into, and then assigning the predetermined value for that range. Similarly, in step 390 the user's credit score is determined based on a predetermined range of scores, where each range is assigned a particular value. Finally, step 390 assigns a value for the user's salary expectation, where a salary in the lowest percentile quadrant is awarded the highest value and a salary in the highest percentile quadrant is assigned a negative number. In step 395, the various values are combined to derive the user's grade for the selected job description in the designated geographic area.

Figure 4:
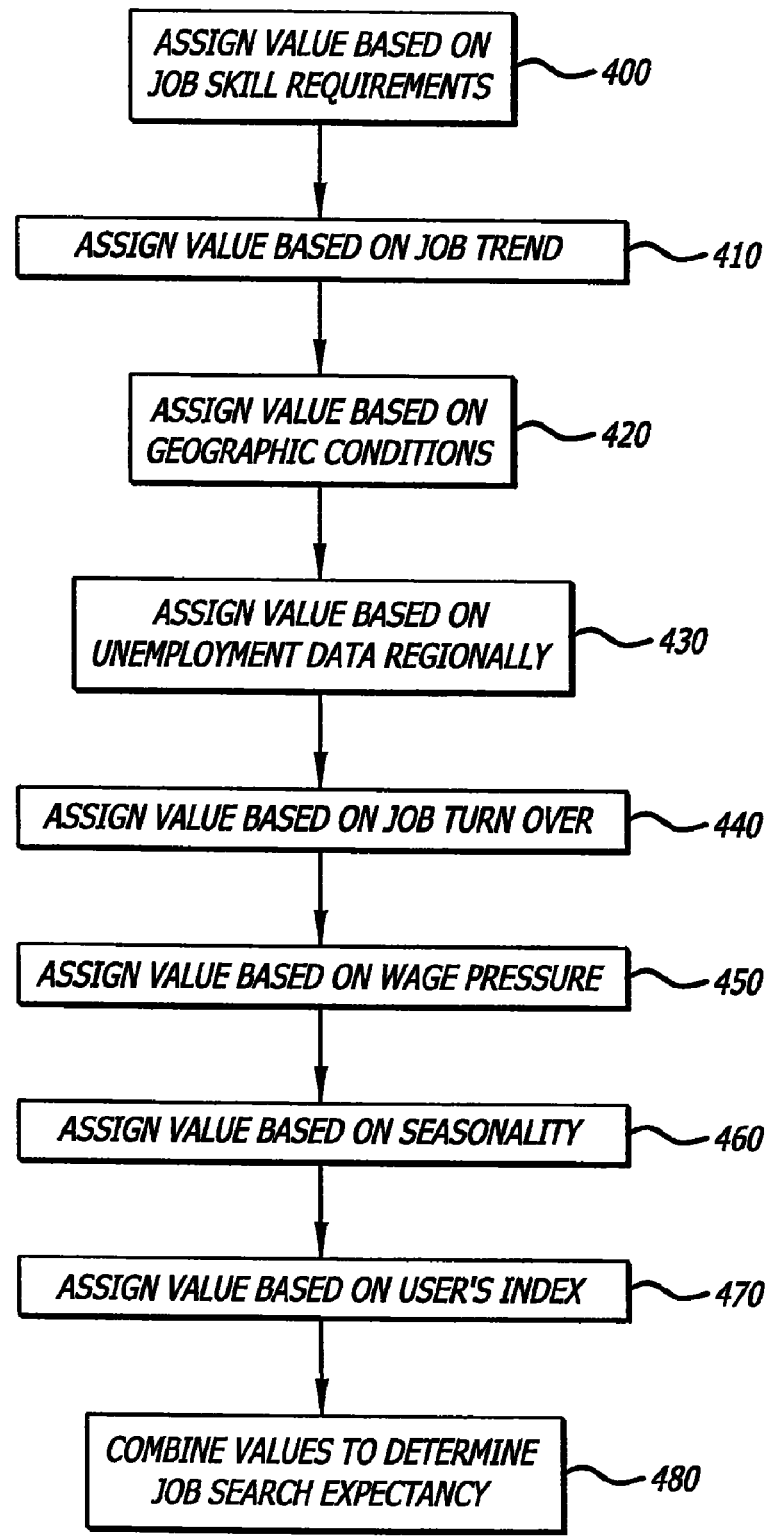
FIG. 4 is a flow chart of the steps carried out by the program to determine the expected job search duration for the selected position in the selected geographic area.

FIG. 4 illustrates the steps used by the program in determining the number of weeks that the user can expect to conduct a job search for the selected position in the designated geographic area. The first step 400 identifies the selected job position as unskilled, low skilled, or high skilled, and assigns a value based on the characterization. In step 410, a value is assigned to the expectancy based on the job employment trend retrieved from an associated database, and in step 420 a value is assigned based on the employment condition for the geographic area similarly retrieved from a database. In step 430, regional unemployment data is used to assign a value, and in step 440 the job's turnover rate is used to assign another value to the search expectancy. In step 450, the wage pressure is used to determine another value, and in step 460 the seasonality influence is assigned a value if applicable. In step 470, the user's grade as determined in step 395 is used to assign the job search another value, and the various values are combined in step 480 to determine the expected job search duration for the selected position in the selected geographic area.

The features of the present invention described above are intended to be illustrative of the present invention but not limiting. Rather, the concepts described herein are intended to provide context to the appended claims without limiting their scope to the described embodiments. Accordingly, the claims should be construed in view of the aforementioned described embodiments, but the meanings of the words in the claims are intended to be those conveyed by their ordinary and customary usage.

I claim:

1. A method for ranking a job seeker's prospects for a given employment position comprising the steps of: establishing an interactive web site for remotely communicating with a user;
   displaying a series of queries to the user to survey a suitability of said user for a selected employment position;
   receiving input from said user in response to said queries;
   deriving a grade within an index associated with a specific set of inputs in response to said queries utilizing a computer program running on the web site, said grade reflecting a quantitative value of suitability for a selected employment position in comparison with other job seekers for said employment position;
   displaying said grade and index to said user; and
   deriving an expected job search duration for the selected employment position based upon said index, and displaying said expected job search duration to said user.

2. The method for ranking a job seeker's prospects for a given employment position of claim 1, wherein said grade is associated with a user specified geographic region.

3. The method for ranking a job seeker's prospects for a given employment position of claim 2, further comprising deriving a percentile salary range, and recommended target salary for a selected employment position in addition to said grade and index, and displaying said percentile salary range, and recommended target salary to said user.

4. The method for ranking a job seeker's prospects for a given employment position of claim 1, wherein said deriving an expected job search duration includes a determination of a skill level associated with said employment position.

5. The method for ranking a job seeker's prospects for a given employment position of claim 1, further comprising determining an alternate employment field, and displaying said alternate employment field to said user.

6. The method for ranking a job seeker's prospects for a given employment position of claim 2, further comprising identifying available job openings matching the selected employment position in said specified geographic region, and displaying said available job openings to said user.

7. The method for ranking a job seeker's prospects for a given employment position of claim 6, further comprising ordering said available job openings according to a correspondence with selected key words, and displaying said job openings to said user in said ordering.

8. The method for ranking a job seeker's prospects for a given employment position of claim 6, further comprising ordering said available job openings in alternative geographic regions, according to a database program.

9. The method for ranking a job seeker's prospects for a given employment position of claim 6, wherein said available job openings are identified from a database linked to an affiliated web site.

10. The method for ranking a job seeker's prospects for a given employment position of claim 1, wherein said deriving a grade within an index includes an algorithmic determination of relevance of a degree earned by said job seeker to said employment position.

11. The method for ranking a job seeker's prospects for a given employment position of claim 1, wherein said deriving a grade within an index includes an algorithmic determination of relevance of a university attended by said job seeker to said employment position.

12. The method for ranking a job seeker's prospects for a given employment position of claim 1, wherein said deriving a grade within an index includes an algorithmic determination of relevance of a grade point average earned by said job seeker to said employment position.

13. The method for ranking a job seeker's prospects for a given employment position of claim 1, wherein said deriving a grade within an index includes an algorithmic determination of relevance of a FICO score associated with said job seeker.

14. The method for ranking a job seeker's prospects for a given employment position of claim 1, wherein said deriving a grade within an index includes an algorithmic determination of a requested salary by said job seeker.

15. The method for ranking a job seeker's prospects for a given employment position of claim 1, wherein said deriving an expected job search duration includes an algorithmic determination of a national hiring trend.

16. The method for ranking a job seeker's prospects for a given employment position of claim 1, wherein said deriving an expected job search duration includes an algorithmic determination of a total number of jobs in a selected geographic region matching said given employment position.

17. The method for ranking a job seeker's prospects for a given employment position of claim 1, wherein said deriving an expected job search duration includes an algorithmic determination of a national unemployment percentage.

18. The method for ranking a job seeker's prospects for a given employment position of claim 1, wherein said deriving an expected job search duration includes an algorithmic determination of a national unemployment annual trend.

19. The method for ranking a job seeker's prospects for a given employment position of claim 1, wherein said deriving an expected job search duration includes an algorithmic determination of a wage pressure in a selected geographic region.

20. The method for ranking a job seeker's prospects for a given employment position of claim 1, further comprising ordering a plurality of geographic regions from a most economically advantageous to a least economically advantageous based on a selected job position.

21. The method for ranking a job seeker's prospects for a given employment position of claim 1, wherein said deriving a grade within an index includes assigning a value to be included in said grade based on a number of jobs held by said job seeker for a selected period of time.

22. The method for ranking a job seeker's prospects for a given employment position of claim 1 further comprising forecasting a salary for said job seeker that includes a component value based on a gender of the job seeker.

23. The method for ranking a job seeker's prospects for a given employment position of claim 1 further comprising forecasting a salary for said job seeker that includes a component value based on an ethnicity of the job seeker.

24. A system for ranking a job seeker's prospects for a given employment position comprising:
a web site accessible by a remote user via an internet connection;
registration means coupled to said web site for entering said remote user's log-in information to gain access to a computer program running on said web site;
query means for surveying the remote user from a list of job descriptions a selected employment position for consideration, and for surveying responses from said remote user to factual inquiries relating to a job search for said selected employment position;
response receiving means for receiving responses from said remote user via said internet in response to said query means' surveying;
grade deriving means for deriving a grade based on said responses from said remote user, where said grade is a numerical value that represents a ranking of said remote user in relation to other job seekers within an index, in connection with said selected employment position;
display means for displaying to said remote user said grade within an index; and
job search estimating means for estimating a duration of a job search by said remote user based on said index.

25. The system for ranking a job seeker's prospects for a given employment position of claim 24, wherein said grade deriving means derives said grade for a user specified geographic region.

26. The system for ranking a job seeker's prospects for a given employment position of claim 24, further comprising percentile salary range, and target salary recommendation deriving means for deriving a percentile salary range, and target salary recommendation for said selected employment position based on said responses from said remote user.

* * * * *